United States Patent [19]
Suzuki et al.

[11] Patent Number: 5,862,347
[45] Date of Patent: Jan. 19, 1999

[54] INFORMATION DISPLAY SYSTEM, INFORMATION DISTRIBUTOR AND INFORMATION DISPLAY APPARATUS

[75] Inventors: Toshimitsu Suzuki; Kazumi Saito; Sadao Yashiro; Takahide Muramoto, all of Kawasaki, Japan

[73] Assignee: Fujitsu Limited, Kawasaki, Japan

[21] Appl. No.: 679,097

[22] Filed: Jul. 12, 1996

[30] Foreign Application Priority Data

Jan. 25, 1996 [JP] Japan .................................. 8-010925

[51] Int. Cl.[6] .................................................. G06F 17/00
[52] U.S. Cl. ............................................................ 395/200.77
[58] Field of Search .................. 395/200.77; 364/715.02; 370/474, 477; 386/21

[56] References Cited

U.S. PATENT DOCUMENTS

| | | | |
|---|---|---|---|
| 5,506,687 | 4/1996 | Gillard et al. | 386/21 |
| 5,521,940 | 5/1996 | Lane et al. | 375/240 |
| 5,557,749 | 9/1996 | Norris | 395/200.77 |
| 5,694,334 | 12/1997 | Donahue et al. | 395/200.77 |

FOREIGN PATENT DOCUMENTS

| | | |
|---|---|---|
| 62-245478 | 10/1987 | Japan . |
| 5-273952 | 10/1993 | Japan . |
| 7-146928 | 6/1995 | Japan . |

*Primary Examiner*—Ellis D. Ramirez
*Attorney, Agent, or Firm*—Staas & Halsey

[57] ABSTRACT

An information display system has an information distribution apparatus (a server) for storing information, upon receipt of an information distribution demand, to distribute requested information to an information distribution requesting source, and an information display apparatus (a client) for displaying information distributed from the server on a display screen through requesting of the server information distribution. In the information display system, only a partial information to be displayed first at the client end is transmitted in form of a non-compression from the server to the client, and the remaining partial information is transmitted in form of a compression from the server to the client.

14 Claims, 24 Drawing Sheets

Fig. 4

| FILE NAME | NON-COMPRESSED FILE NAME | COMPRESSED FILE NAME |
|---|---|---|
| sample1 | sample1.n | sample1.e |
| sample2 | sample2.n | sample2.e |
| sample3 | sample3.n | sample3.e |
| . . . | . . . | . . . |

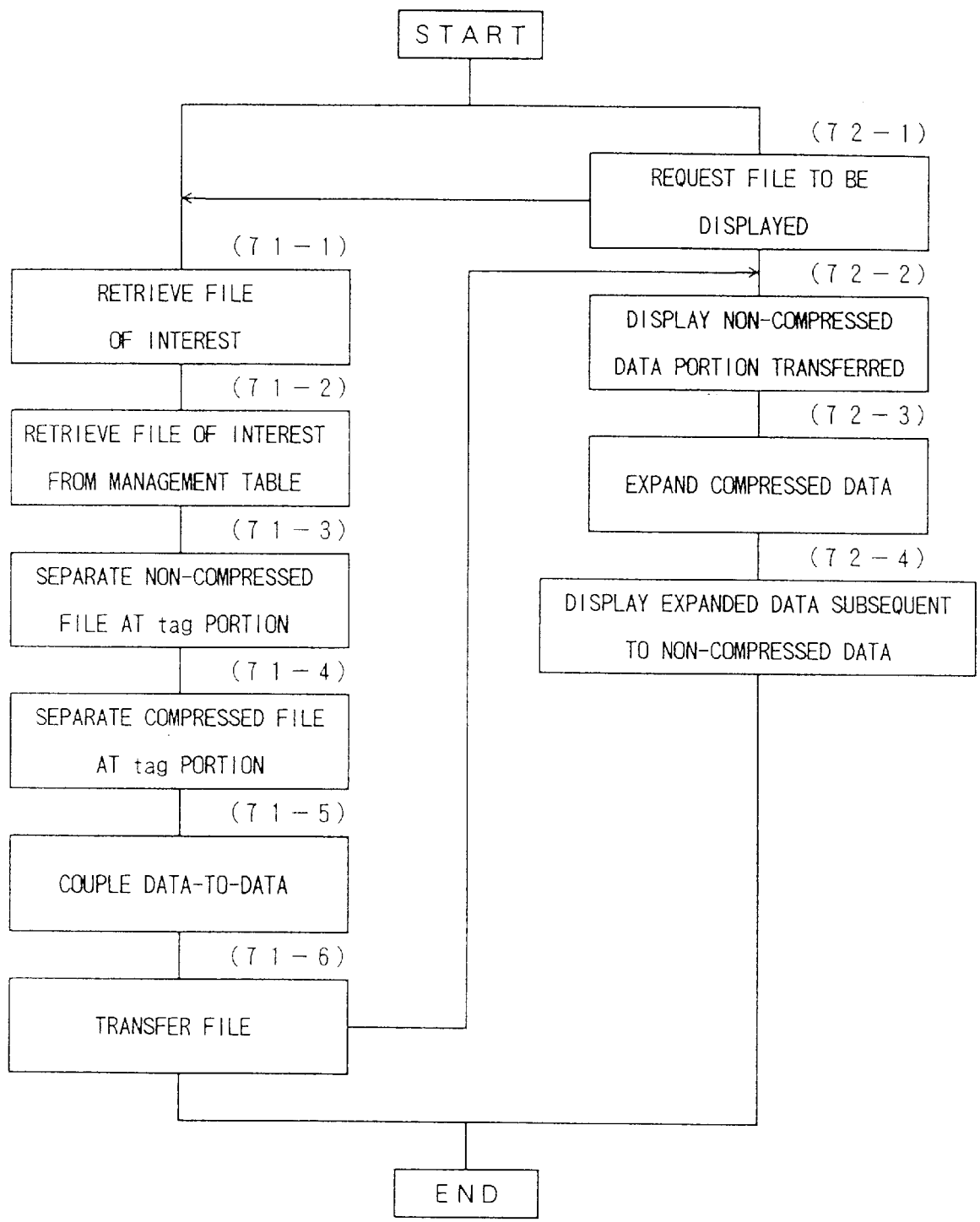

Fig. 8 ( A )
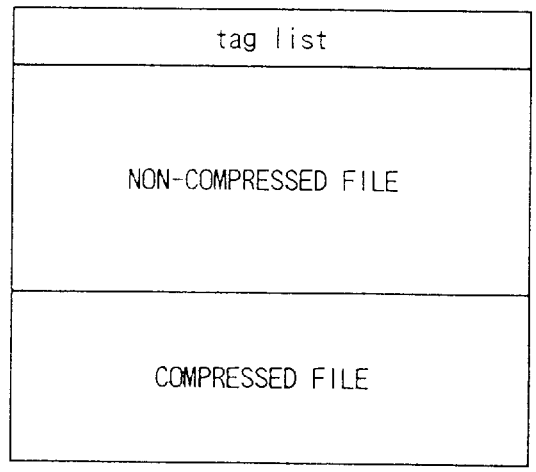
Fig. 8 ( B )
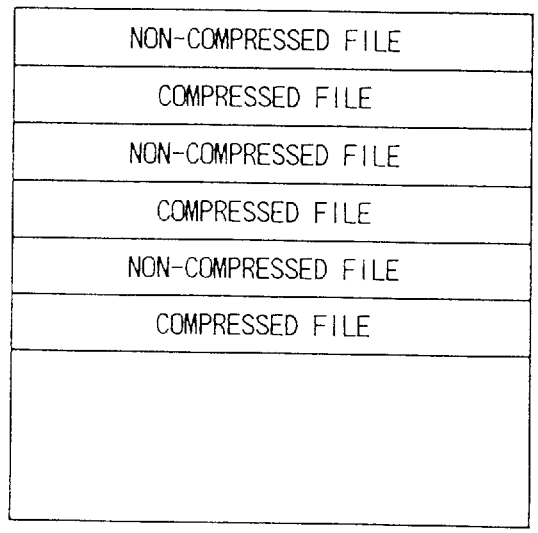

Fig. 9 (A)

| USERID | X size | Y size |
|---|---|---|
| xxxxxx1 | 100 | 400 |
| xxxxxx2 | 640 | 480 |
| xxxxxx3 | 800 | 600 |
| xxxxxx4 | 640 | 800 |
| ⋮ | ⋮ | ⋮ |

Fig. 9 (B)

| SIZE | CHARACTER NUMBER |
|---|---|
| 0−10000 | 100 |
| 10001−20000 | 200 |
| 20001−30000 | 300 |
| 30001−40000 | 400 |
| ⋮ | ⋮ |

Fig. 12

| USER ID | CHARACTER NUMBER |
|---|---|
| xxxxxx 1 | 2 4 0 |
| xxxxxx 2 | 4 0 0 |
| xxxxxx 3 | 1 2 0 |
| xxxxxx 4 | 3 0 0 |
| . | . |
| . | . |
| . | . |

Fig. 22 (A)

```
THIS COMPOSITION IS A SAMPLE.
IT IS STORED IN A REGULAR TEXT FORMAT IN
 WHICH DATA IS NOT COMPRESSED. ......
```

Fig. 22 (B)

```
M7/S1?R3A¯ _¥E8Q9@@
S0D2%Z*Y7*⊤ (¥O8?' ˆ)@
@9C' RWO4([? (+2 (19E0_G
)NM&1L;D (D%F;, 8>G*S¯
2WIQFMDD, !>2' 7(T·, +X
SL62/2C:U:O9V6KS$I7K
P9BDQ:O8(. SM. . . ・・・
```

INFORMATION DISPLAY SYSTEM, INFORMATION DISTRIBUTOR AND INFORMATION DISPLAY APPARATUS

BACKGROUND OF THE INVENTION

1. Field of the Invention

The present invention relates to an information distributor (a so-called server) in which information is stored, and upon receipt of information distributing request, the requested information is distributed toward an information distribution demand source, an information display apparatus (a so-called client) in which information distribution is requested to an information distribution source, and information provided from the information distribution source is displayed on a display screen, and an information display system in which the information distributor and the information display apparatus are connected via communication lines to one another.

2. Description of the Related Art

Information display systems as mentioned above, that is, systems in which the server and the client are connected via communication lines such as a telephone line, a LAN and the like, have come into wide use recently.

FIG. 21 is a block diagram showing the basic arrangement of constituents of a network system having a server and a client. Usually, while there is a case in which a plurality of clients are connected and also a plurality of servers are connected, here it is assumed, for the purpose of simplification, that one server and one client are connected to one another through a network.

FIG. 22(A) and 22(B) are each a typical illustration of a format of information stored in a server.

The server 10 is provided with a large capacity of information storage unit 11. The information storage unit 11, stored much information, such as a non-compressed type of information, as shown in FIG. 22 (A), which can be displayed as it is, and a compression type of information, as shown in FIG. 22 (B), which cannot be displayed as proper information in the present form. An advantageous point of storage of information in compressed form resides in the point that a data storage capacity can be reduced. On the other hand, in order to display such information as proper information, there is a need to expand the compression type of information into the non-compressed type of information.

The server 10 further comprises a computer 12, such as a personal computer (PC) and a work station (WS), for executing programs to operate the server 10 including a program for accessing the information storage unit 11 and a program for transmitting the information read from the information storage unit 11 via a network 30 to the client; and display 13 for displaying information involved in management of the server 10.

The server 10 basically has the arrangement as mentioned above, and serves to distribute information via the network 30 to the client 20.

Specifically, as a famous server system, there is known a WWW (World Wide Web) of an interest. Usually, actuation of an HTTP daemon on an OS (Operating System) such as an UNIX or Windows NT permits access from a client application such as Mosaic, thereby transmitting information of interest to the client.

On the other hand, the client 20 is a computer system having a display 21 for displaying information transmitted from the server 10. The client 20 comprises an interface 22 for receiving and transmitting data via the network 30; a CPU 23 for executing an OS, an application software and the like; a memory 24 for temporarily storing the OS, the application software and various kinds of data so that the CPU 23 may refer to those; an information storage unit 25 for storing the OS, the application software, data and the like; and a user interface 26 including a keyboard, a mouse and the like. The information storage unit 25 comprises, usually, a hard disk device and the like so as to store an application software for expanding a compression type of data, an application software for an information display, and the like. Those application softwares are developed on the memory 24 when executed in the CPU 23. The information storage unit 25 serves as a storage place for temporarily storing information transferred from the server 10.

The client 20 has basically a structure of usual personal computer as mentioned above. For example, a WWW browser (an example of a communication software) such as Mosaic is available. The client 20 is operative to request a distribution of information through the network 30 to the server 10 and to display on the display 21 information transmitted from the server 10 via the network 30. It is possible, through clicking by the mouse provided as the user interface 26, of the information displayed on the display 21 characters or still picture portions linked with other information, to display the linked information.

FIG. 23 is a flowchart showing schematically a basic processing routine in the server and the client.

First, at the client end the communication software is activated (step 20-1), and information to be displayed is requested to the server (step 20-2). At the server end, it is observed as to whether information distribution demand has been received from the client (step 10-1). When the server received the information distribution demand from the client, the server transmits the requested information (file) to the client (step 10-2). The client refers to a header of the transmitted file to determine as to whether the transmitted file is a compressed type of file or a non-compressed type of file (step 20-3) on a basis of information recorded on the header. In a case where it is the non-compressed type of file, upon receipt of the information in its entirety (step 20-4), the information is displayed (step 20-5).

In step 20-3, when it is determined that the file transmitted from the server is an information file of a compressed type, the process goes to step 20-6 in which it is determined whether the provided file is to be preserved. The reason why it is determined whether the file is to be preserved is that in case of the compressed file, it takes a lot of time to expand the compressed file, or there is a need to additionally provide a corresponding expansion software, and in view of the foregoing, it often happens that the file is cancelled without being displayed. It is acceptable that such a decision is effected through operation of the user interface 26 by a user of the client, alternately it is instructed beforehand to the client that the compressed file is not preserved. In a case where the compressed file is to be preserved, after completion of receiving of the compressed file (step 20-7), the received information is stored in form of compression in the information storage unit 25 (step 20-8).

After the preservation, an information expansion program is activated so that the compressed file stored in the information storage unit 25 is expanded into the form of non-compression and displayed on the display 21.

In the system, as mentioned above, in which information is transmitted from the server to the client and the transmitted information is displayed at the client end, it is desired that after the client requires the server to provide information, the required information is transmitted in short time from the server and is immediately displayed.

However, in case of non-compressed type of information, it takes a lot of time to transmit information from the server 10 to the client 20. Specifically, in a case where a communication rate of the network 30 is low, or in a case where information, which is large in information rate, for example, information of images or animations, is transmitted, it takes a lot of time before that information is displayed. This involves a problem such that the user of the client 20 is obliged to wait such long time. Further, in a case where the network 30 is a telephone line, taking much time for communication involves a problem such that a service charge for use of the line is increased. Furthermore, in a case where an internet is utilized, a line-occupied factor will be increased. This brings about a problem such that an increment of the user involves a lowering of the transfer rate.

On the other hand, in a case where the compressed type of information is transferred from the server 10 to the client 20, the communication time is reduced by the corresponding reduced data capacity in which information is compressed. However, at the client end which receives the compressed information, there is a need to expand the compressed information to the non-compressed type of information. Thus, it takes much time for expansion. Also in this case, there arises a problem such that it takes a lot of time before information is displayed.

FIGS. 24 (A) and (B) are each a typical illustration useful for understanding a display scheme for a GIF type of image information.

As to the GIF type of image information, there is known a scheme in which as shown in FIG. 24 (B), an image is displayed in the order of scan lines 1, 2, 3, . . . arranged on a jumping basis, a so-called interlace reproducing is performed, instead of a scheme in which as shown in FIG. 24 (A), an image is displayed in the order of scan lines 1, 2, 3, . . . arranged on a sequential basis. Also in case of the interlace reproducing, the total time taken up to a sheet of picture being displayed in its entirety is the same as the scheme shown in FIG. 24 (A). In spite of this matter, the interlace reproducing scheme may give the impression for the user of the client 20 just like that the image is displayed in short time after the user requests information. Thus, the user of the client 20 may be released from an irritation such that the user is obliged to wait for a long time before the image is displayed. However, this scheme is applicable to the GIF type of image only, but not applied to another file type of information. Further, it is noted that the interlace reproducing scheme simply gives the user of the client 20 an illusion just like that the image is immediately displayed, but the display of information is not indeed hastened.

SUMMARY OF THE INVENTION

In view of the foregoing, it is therefore an object of the present invention to provide an information display system capable of reducing the time needed from the time distribution of information was required until the display of the information, and an information distributor (a server) and an information display apparatus (a client) which are suitable for the information display system.

To attain the above-mentioned object, according to the present invention, there is provided an information display system comprising an information distribution apparatus for storing information, upon receipt of an information distribution demand, to distribute requested information to an information distribution requesting source, and an information display apparatus for displaying information distributed from said information distribution apparatus on a display screen through requesting of said information distribution apparatus information distribution, in which said information distribution apparatus and said information display apparatus are connected to each other via a communication line.

The information distribution apparatus of the present invention comprises an information distributing unit adapted to distribute a first partial information to be first displayed on said information display apparatus of a plurality of pieces of partial information, which are partitioned in information to be distributed to said information display apparatus, to said information display apparatus in non compressed form, and to distribute a second partial information comprising at least a part of the remaining partial information excepting the first partial information to said information display apparatus in compression form.

the information display apparatus of the present invention comprises an information expansion unit for expanding the second partial information into a non-compressed format of information, and a display control unit for displaying first the first partial information and thereafter displaying partial information other than the first partial information.

In the above-mentioned information display system, it is acceptable that said information display apparatus comprises a character number informing unit for informing said information distribution apparatus of character number information representative of a number of characters to be displayed on said information display apparatus or to be converted into the number of characters; and that said information distribution apparatus partitions information to be distributed to said information display apparatus into sizes according to the character number information informed from said information display apparatus thereby producing said plurality of pieces of partial information.

Further, in the above-mentioned information display system, it is acceptable that said information display apparatus comprises an information distribution requirement unit adapted to request of said information distribution apparatus a distribution of information prior to distributing information from said information distribution apparatus, and to request of said information distribution apparatus a distribution of information whenever a display is updated even in mid way of display of information distributed from said information distribution apparatus; and that said information distribution apparatus distributes information to said information display apparatus in such a manner that the first partial information is distributed in non-compressed form in accordance with a first information distribution request issued from said information display apparatus, and the remaining pieces of partial information are distributed in compressed form in accordance with a new information distribution request issued from said information display apparatus.

Furthermore, in the above-mentioned information display system, it is acceptable that said information display apparatus comprises an information distribution requirement unit adapted to request of said information distribution apparatus a distribution of information prior to distributing information from said information distribution apparatus, and to request of said information distribution apparatus a distribution of information whenever a display is updated even in mid way of display of information distributed from said information distribution apparatus; and that said information distribution apparatus distributes information to said information display apparatus in such a manner that the first partial information is distributed non compressed form in accordance with a first information distribution request issued from said information display apparatus, the partial information to be displayed subsequent to a display of the first partial information is distributed compressed form, and the remaining pieces of partial information are distributed in compressed form in accordance with a new information distribution request issued from said information display apparatus.

Still to attain the above-mentioned object, according to the present invention, there is provided an information distribution apparatus for storing information, upon receipt of an information distribution demand, to distribute requested information to an information distribution requesting source.

The information distribution apparatus of the present invention comprises an information distributing unit adapted to distribute a first partial information to be first displayed on said information display apparatus of a plurality of pieces of partial information, which are partitioned in information to be distributed to said information display apparatus, to said information display apparatus in non-compressed form, and to distribute a second partial information comprising at least a part of the remaining partial information excepting the first partial information to said information display apparatus in compressed form.

In the above-mentioned information distribution apparatus, it is acceptable that the information distribution apparatus further comprises: a character number receiving unit for receiving character number information representative of a number of characters to be utilized at a time in an information distribution requesting source or to be converted into the number of characters; and an information partitioning unit for partitioning information to be distributed to said information distribution requesting source into sizes according to the character number information informed from said information distribution requesting source thereby producing said plurality of pieces of partial information.

Further, in the above-mentioned information distribution apparatus, it is acceptable that the information distribution apparatus further comprises an information storage unit for storing information to be distributed to an information distribution requesting source in both compressed and non-compressed forms The information distributing unit distributes information to the information distribution requesting source in combination of a compressed type of partial information and a non-compressed type of partial information; that the information distribution apparatus further comprises an information storage unit for storing information to be distributed to an information distribution requesting source in non-compressed form. The information distributing unit distributes information to the information distribution requesting source through compressing said second partial information. The information distribution apparatus further comprises an information storage unit for storing information to be distributed to an information distribution requesting source in compressed form, and said information distributing unit distributes information to the information distribution requesting source through expanding said first partial information to a non-compressed type of information.

Furthermore, in the above-mentioned information distribution apparatus, it is acceptable that said information distribution apparatus distributes information to said information display apparatus in such a manner that the first partial information is distributed in non-compressed form in accordance with a first information distribution request issued from said information display apparatus, and the remaining pieces of partial information are distributed in compressed form in accordance with a new information distribution request issued from said information display apparatus; or that said information distribution apparatus distributes information to said information display apparatus in such a manner that the first partial information is distributed in non-compressed form in accordance with a first information distribution request issued from said information display apparatus, the partial information to be displayed subsequent to a display of the first partial information is distributed in form of compression, and the remaining pieces of partial information are distributed in compressed form in accordance with a new information distribution request issued from said information display apparatus.

Still further to attain the above-mentioned object, according to the present invention, there is provided an information display apparatus for displaying information distributed from an information distribution source on a display screen through requesting of said information distribution source information distribution.

The information display apparatus of the present invention comprises an information receiving unit for receiving a distribution of information consisting of a non-compressed type of partial information and a compressed type of partial information.

The information display apparatus of the present invention further comprises an information expansion unit for expanding a compressed type of partial information of information distributed from the information distribution source to a non-compressed type of partial information; and a display control unit for providing such a control that at least a part of first partial information of the partial information distributed in non-compressed form from the information distribution source and thereafter partial information other than the first partial information is displayed.

In the above-mentioned information display apparatus, it is acceptable that the information display apparatus further comprises a character number informing unit for informing the information distribution source of character number information representative of a number of characters to be displayed on said information display apparatus or to be converted into the number of characters.

Further, in the above-mentioned information display apparatus, it is acceptable that the information display apparatus further comprises an information distribution requirement unit adapted to request of the information distribution source a distribution of information prior to distributing information from the information distribution source, and to request of the information distribution source a distribution of information whenever a display is updated even in mid way of display of information distributed from the information distribution source.

According to the present invention, information to be displayed first in the information display apparatus (client) is distributed in non-compressed form. Thus, it is possible at the client end to immediately display such information. Further, according to the present invention, at least a part of pieces of information other than information which is to be displayed first is distributed in compressed form. Thus, it is possible to perform a communication in short time. In addition, it is possible that the information, which was distributed to the client side in compressed form, is subjected to an expansion processing while information distributed in non-compressed form is displayed. Therefore, according to the present invention, it is possible to attain in good balance both a high speed communication and a reduction of waiting time for a display.

BRIEF DESCRIPTION OF THE DRAWINGS

FIG. 4 is a typical illustration showing a management table for information stored in the server;

FIG. 7 is a flowchart of a basic processing routine of the server and the client according to one embodiment of the present invention;

FIGS. 8(A) and (B) are each a typical illustration showing another aspect in which the same information is stored at the server end in both the forms of the non-compression type and the compression type;

FIGS. 9(A) and (B) are the illustrations of a management table in which sizes of a display area of the respective clients, which were informed from a plurality of clients to the server, and a character number corresponding table which represents a corresponding relation between the size of the display area and the number of characters which can be displayed in the associated display area, respectively;

FIG. 12 is a typical illustration of a character number management table which represents a corresponding relation between the client and the number of characters which can be displayed in the associated display area;

FIG. 22(A) and 22(B) are each a typical illustration of a format of information stored in a server;

DESCRIPTION OF THE PREFERRED EMBODIMENTS

Hereinafter, there will be described embodiments of the present invention.

(First embodiment)

Figure 1:
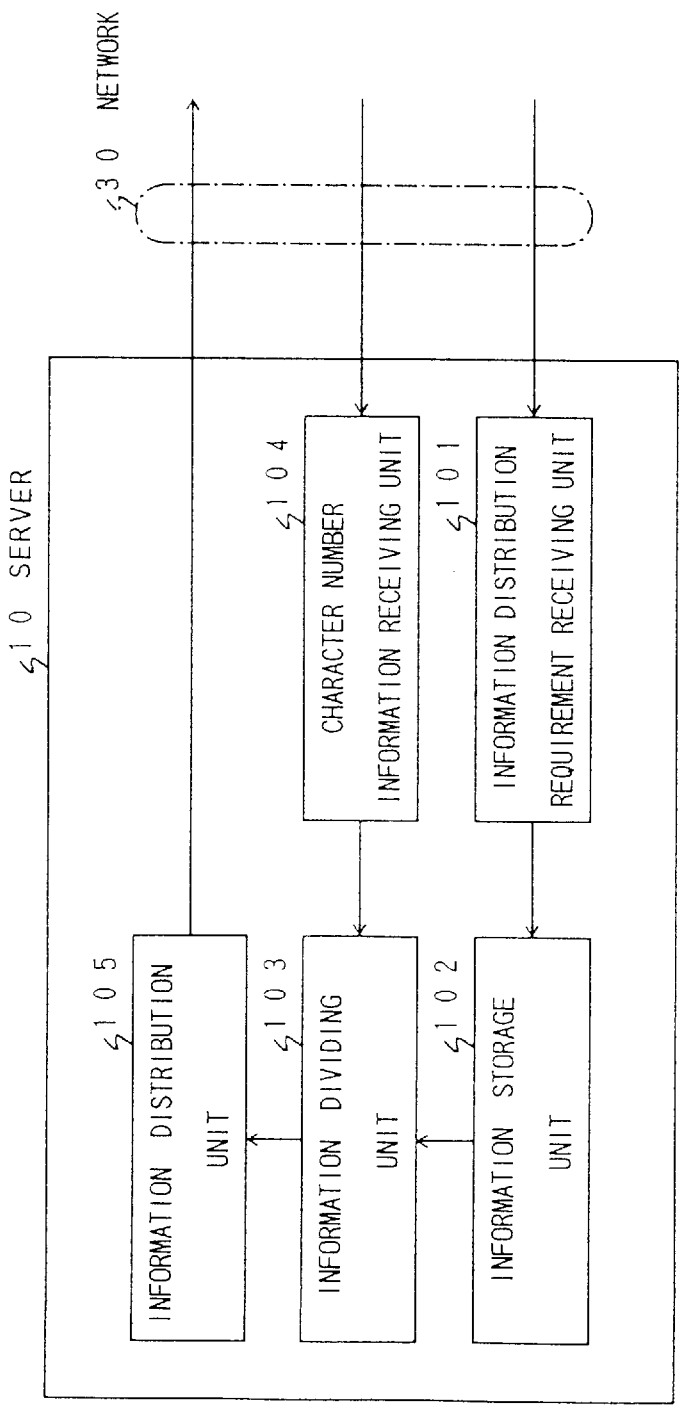
FIG. 1 is a functional block diagram of a server constituting an information display system according to the present invention.
Figure 2:
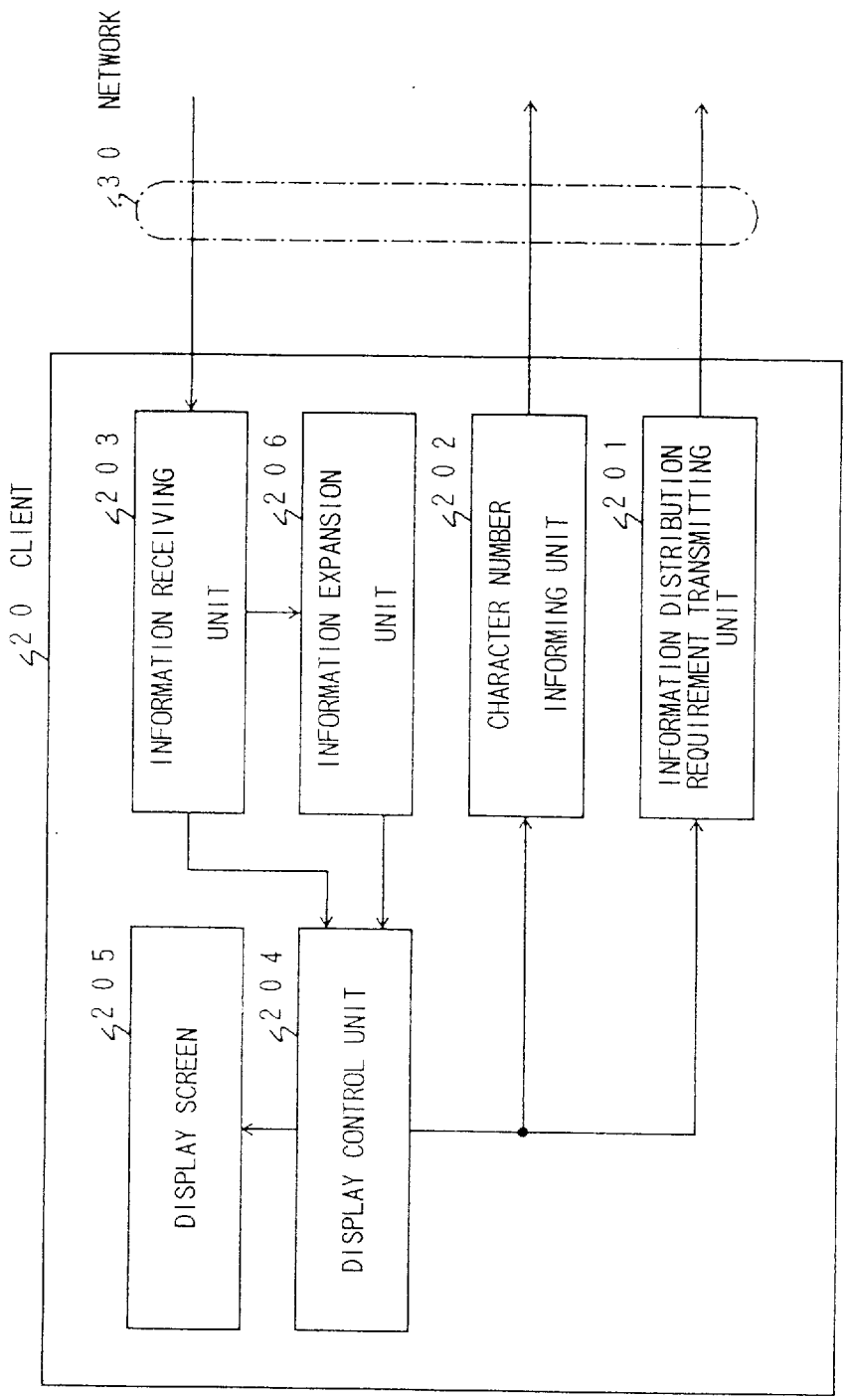
FIG. 2 is a functional block diagram of a client constituting an information display system according to the present invention.

FIGS. 1 and 2 is a functional block diagram of a server constituting an information display system according to the present invention.

Figure 21:
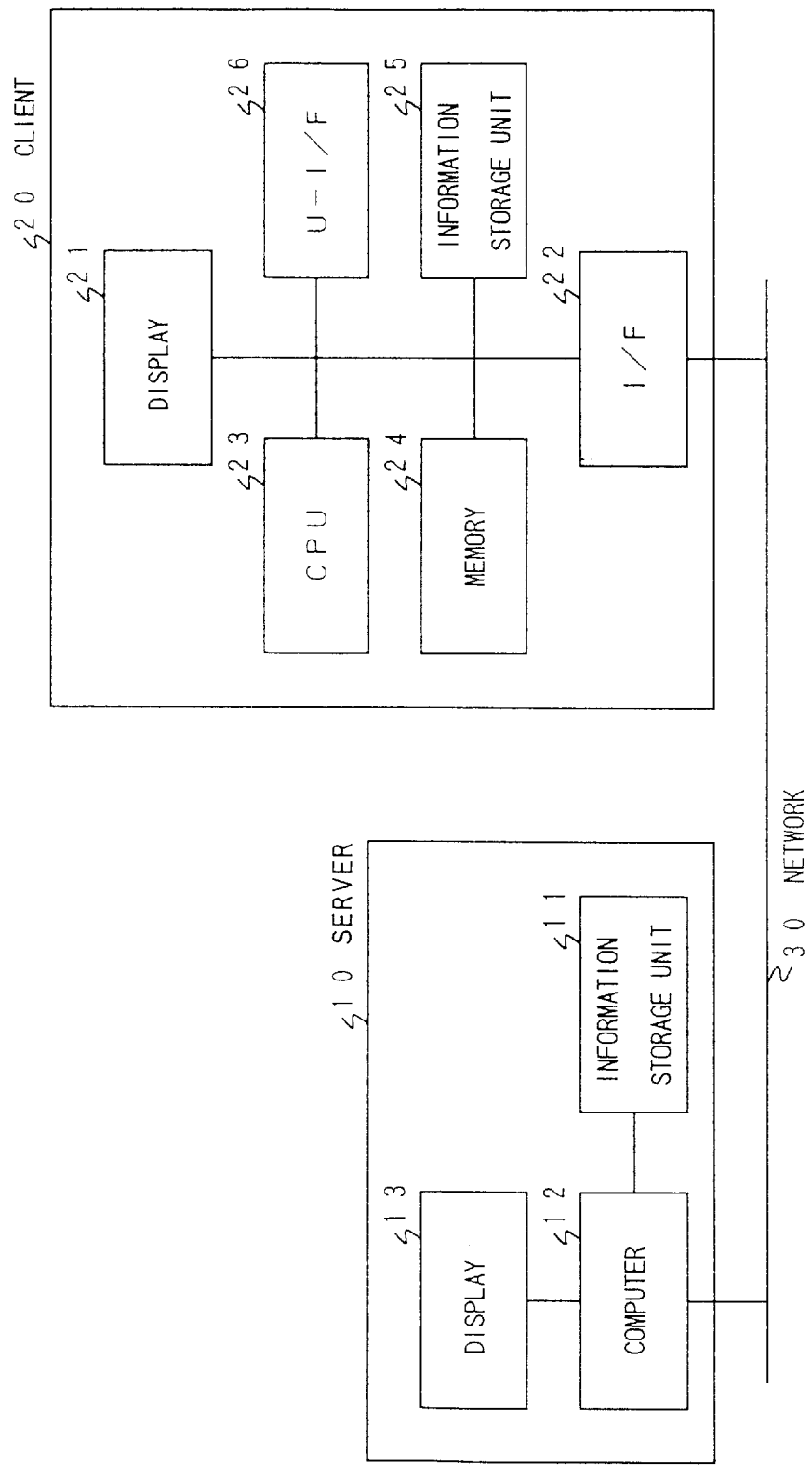
FIG. 21 is a block diagram showing the basic arrangement of constituents of a network system having a server and a client.
Figure 23:
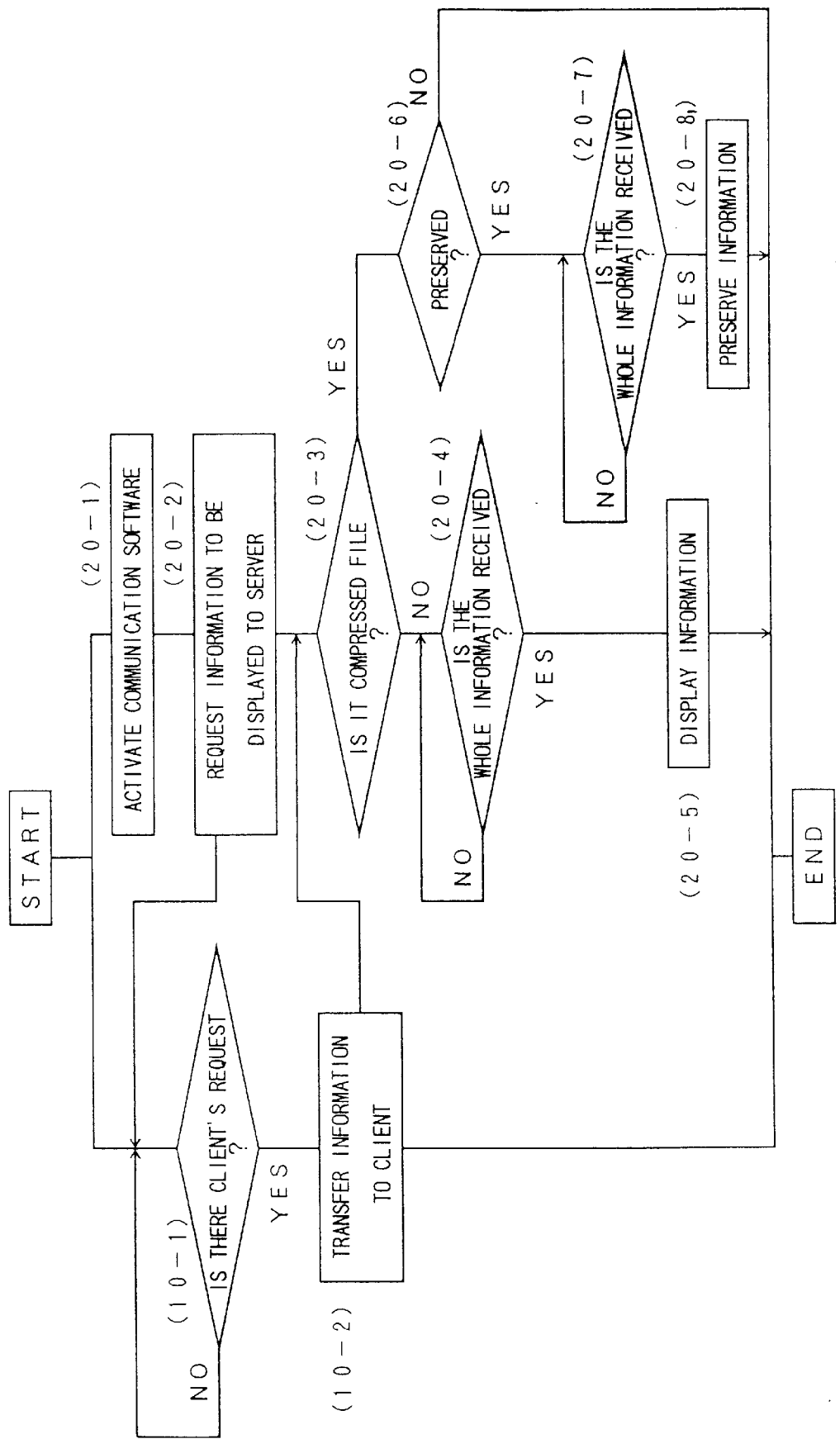
FIG. 23 is a flowchart showing schematically a basic processing routine in the server and the client.
Figure 24:
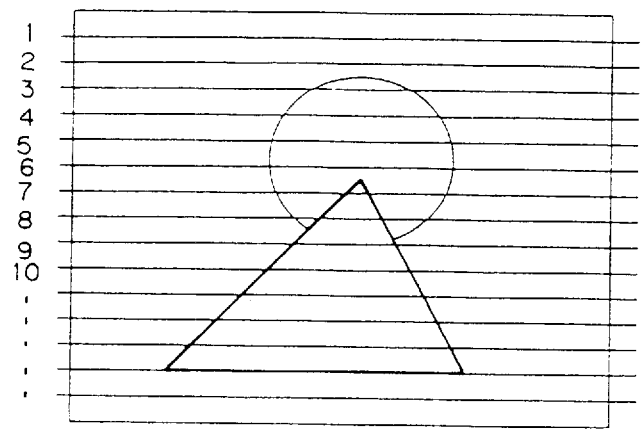
FIGS. 24 (A) and (B) are each a typical illustration useful for understanding a display scheme for a GIF type of image information.
Figure 24:
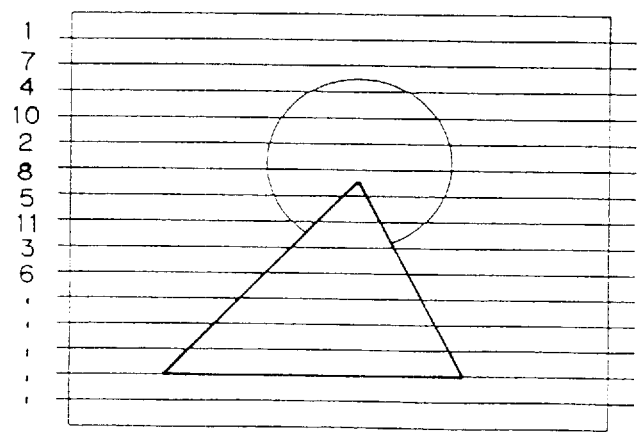

The server and the client according to the present embodiment of the invention are constituted as shown in FIG. 21 in form of a hardware. On the other hand, FIGS. 1 and 2 show the server and the client on a functional block basis, respectively.

A server 10 shown in FIG. 1 and a client 20 shown in FIG. 2 are connected to each other via a network 30. The server 10 receives at an information distribution requirement receiving unit 101 an information distribution demand transmitted from an information distribution requirement transmitting unit 201 of the client 20, and passes the same to an information storage unit 102. The information storage unit 102 stores information to be distributed to the client 20. Upon receipt of information distribution demand from the client 20, information according to the demand is transmitted from the information storage unit 102 to an information dividing unit 103. The client 20 transmits information as to the size of a display window provided at the client 20 end and information as to the number of characters which can be displayed on the display window (information representative of the number of characters directly or indirectly is referred to as character number information) together with a information distribution demand, or prior to the information distribution demand, from a character number informing unit 202 to a character number information receiving unit 104. The received character number information is transmitted to the information dividing unit 103. In the information dividing unit 103, information transmitted from the information storage unit 102 is divided in accordance with the character number information, and then transmitted to an information distribution unit 105. The information distribution unit 105 transmits the information sent from the information dividing unit 103 via the network 30 to the client 20 through providing such an editing that of the information divided in accordance with the character number information, information which is to be displayed first at the client end, for example, the first one page of information is given in form of a non-compression, and information other than the first one page of information is given in form of a compression.

Figure 3:
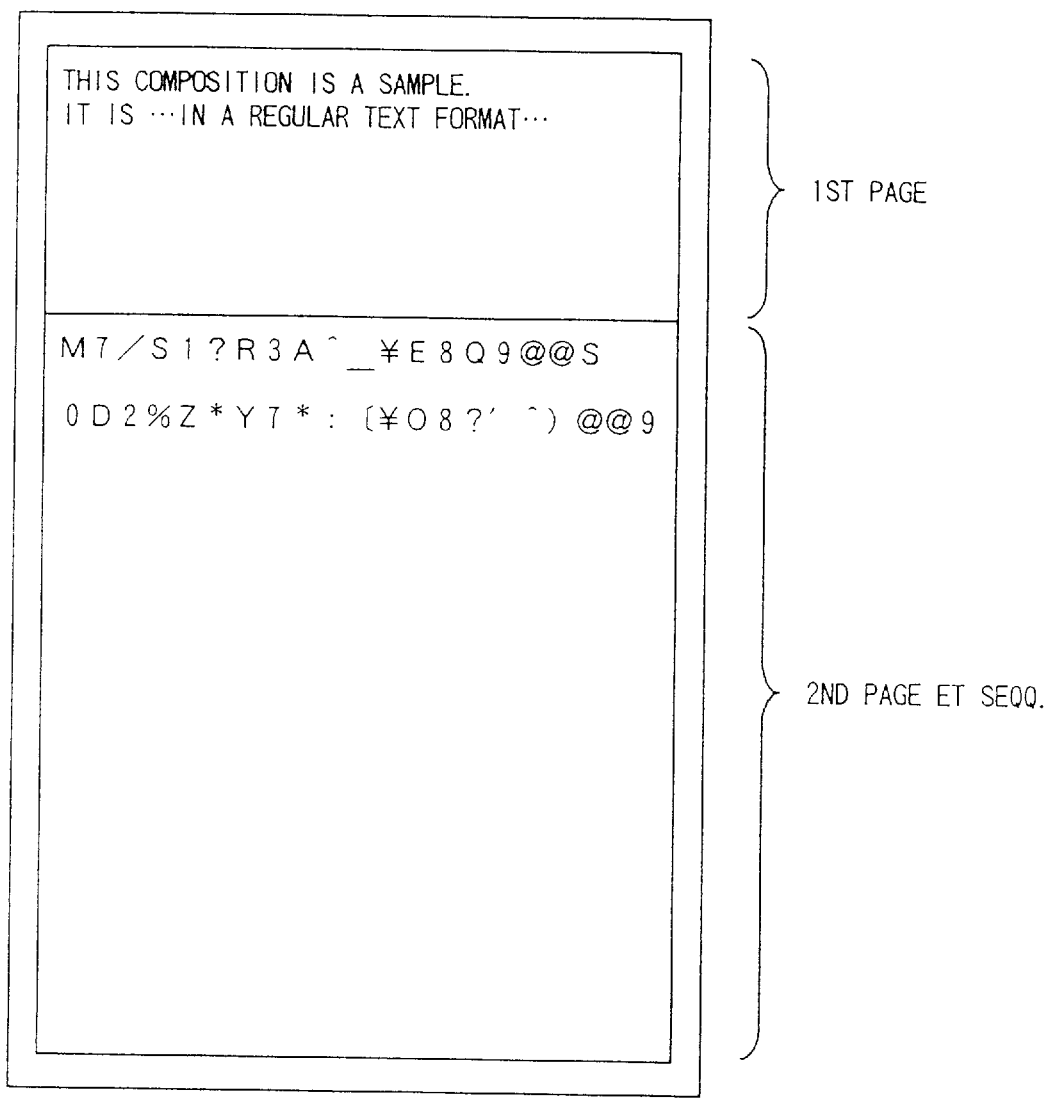
FIG. 3 is a typical illustration showing a file format of information transmitted from the sever to the client.

FIG. 3 is a typical illustration showing a file format of information transmitted from the sever to the client.

As seen from FIG. 3, only the first page is given with a non-compression type of partial information, and the second page et seqq. are given with a compression type of partial information.

On the client 20 side, the transmitted information given with the form as shown in FIG. 3 is received at an information receiving unit 203 (cf. FIG. 2) in which of the received information the first page of non-compression type of partial information is transmitted to a display control unit 204 as it is, and the second page et seqq. of compression type of partial information is transmitted to the display control unit 204 after expansion into the non-compression type of partial information. Information thus transmitted is displayed on a display screen 205 on a refreshing basis.

Incidentally, it is acceptable to arrange the system in such a way that the information distribution requirement transmitting unit 201 of the client 20 not only requires a distribution of information of the server 10 prior to the distribution of information from the server 10, but also requires a distribution of information of the server 10, whenever an update of a display on the display screen 205 is performed under control of the display control unit 204, even in mid way of displaying information distributed from the server 10, and in the server 10 partial information partitioned in information of interest to be distributed is distributed for each demand, but not providing the required information in it entirety at once.

The above-mentioned embodiment concerns a schematic one of the present invention. Various embodiments of the present invention will be described hereinafter.

(Second embodiment)

Figure 5:
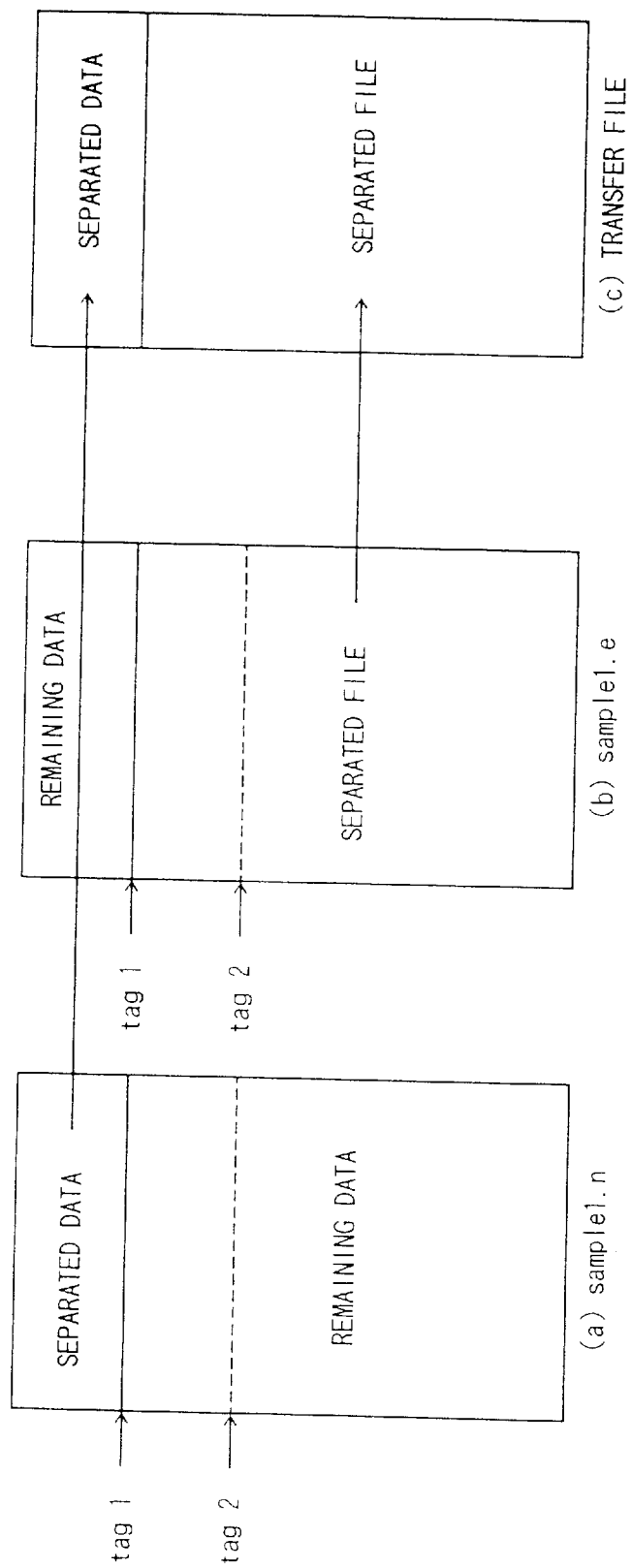
FIG. 5 is a typical illustration useful for understanding a processing system for information transferred from the sever to the client.
Figure 6:
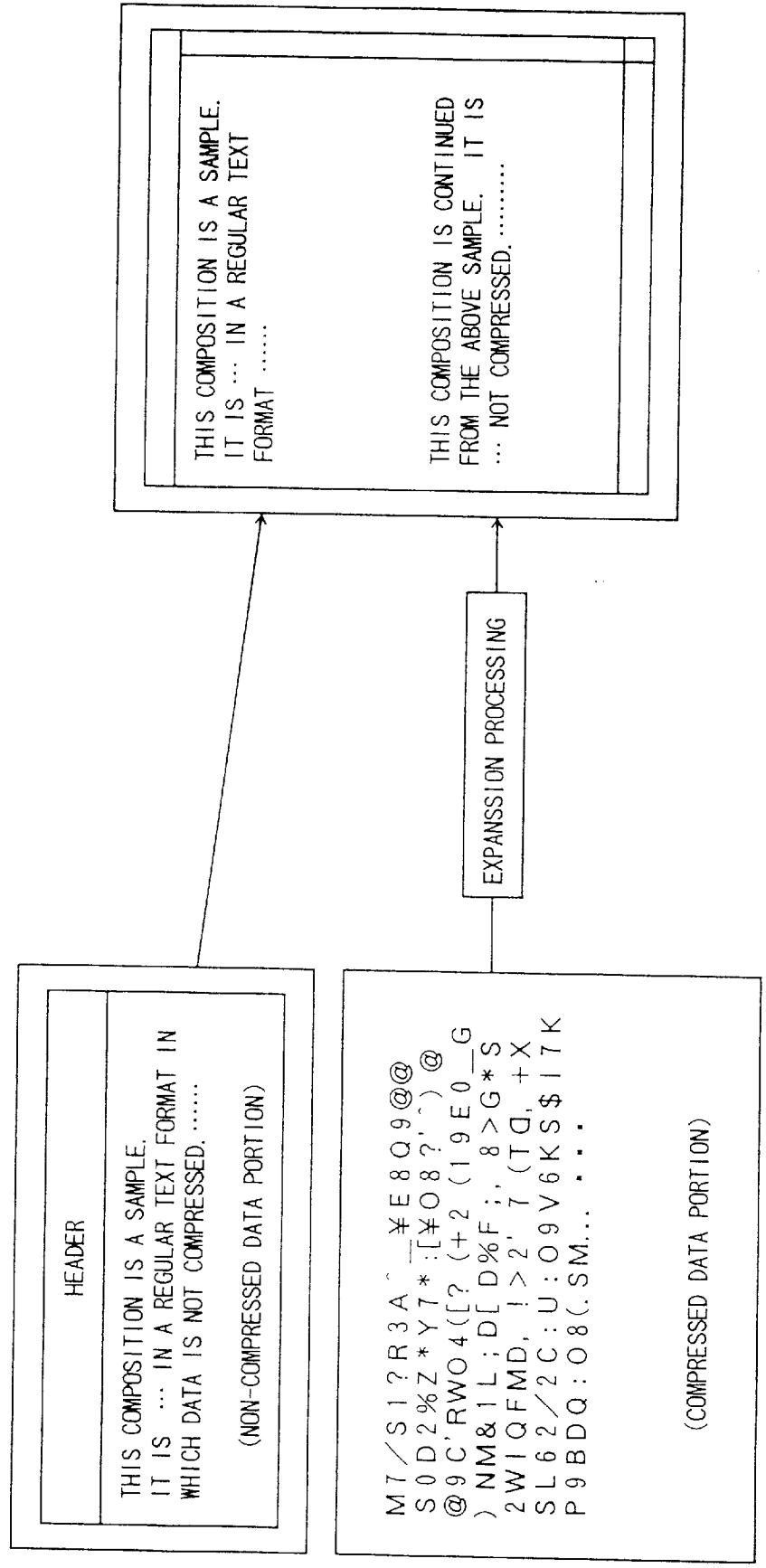
FIG. 6 is a typical illustration useful for understanding a processing system for a file transferred to the client end.

FIG. 4 is a typical illustration showing a management table for information stored in the server. FIG. 5 is a typical illustration useful for understanding a processing system for information transferred from the sever to the client. FIG. 6 is a typical illustration useful for understanding a processing system for a file transferred to the client end. FIG. 7 is a flowchart of a basic processing routine of the server and the client according to one embodiment of the present invention;

In the system structure as shown in FIG. 21, information storage unit 11 stores the same information in both the formats of a non-compression type and a compression type. In the management table shown in FIG. 4, non-compressed file XXX.n and compressed file XXX.e are managed with the identical file name XXX. The non-compressed files XXX.n and the compressed files XXX.e are labeled with tag 1, tag 2, . . . at the associated position.

Referring to FIG. 7, the client 20 requests of the server 10 a file to be displayed (step 72-1). In the server 10, upon receipt of the information distribution demand from the client 20, the file of interest is retrieved to find that the file is managed in the management table shown in FIG. 4 (step 71-1). Then, the process goes to a step 71-2 in which the management table is retrieved to specify a certain file (e.g. a file name: sample 1).

Thereafter, in steps 71-3 and 71-4, of the specified file name sample 1 the non-compressed file sample 1.n and the compressed file sample 1.e are each separated at the first tag 1. In step 71-5, as shown in FIG. 5, a portion of the non-compressed file sample 1.n (part (a) of FIG. 5), which is located at stage before tag 1, and a portion of the compressed file sample 1.e (part (b) of FIG. 5), which is located at stage after tag 1, are coupled with each other other to form a transfer file as shown in part (c) of FIG. 5. The transfer file thus formed is transferred from the server 10 to the client 20.

On the client 20 side, upon receipt of the transfer file, first, the non-compressed data portion of the first of the transfer file is displayed (step 72-2). Then, the compressed data portion is expanded into the non-compressed data (step 72-3). The expanded data is coupled with the data portion, which is transmitted in form of an originally non-compressed data, and is displayed subsequent to the non-compressed data portion (step 72-4) as shown in FIG. 6.

FIGS. 8(A) and (B) are each a typical illustration showing another aspect in which the same information is stored at the server end in both the forms of the non-compression type and the compression type.

According to the above-mentioned embodiment, the non-compression type of information and the compression type of information are provided in form of individual files, and those files are managed in the management table shown in FIG. 4. On the other hand, it is acceptable to adopt, instead of the management scheme as mentioned above, a management scheme such that as shown in FIG. 8(A) the non-compressed file and the compressed file are coupled to form a single format and managed in form of the coupled file, and also acceptable to adopt another management scheme such that as shown in FIG. 8(B) the non-compressed files and the compressed files are alternately arranged and managed in form of such an arrangement.

(Third embodiment)

Figure 10:
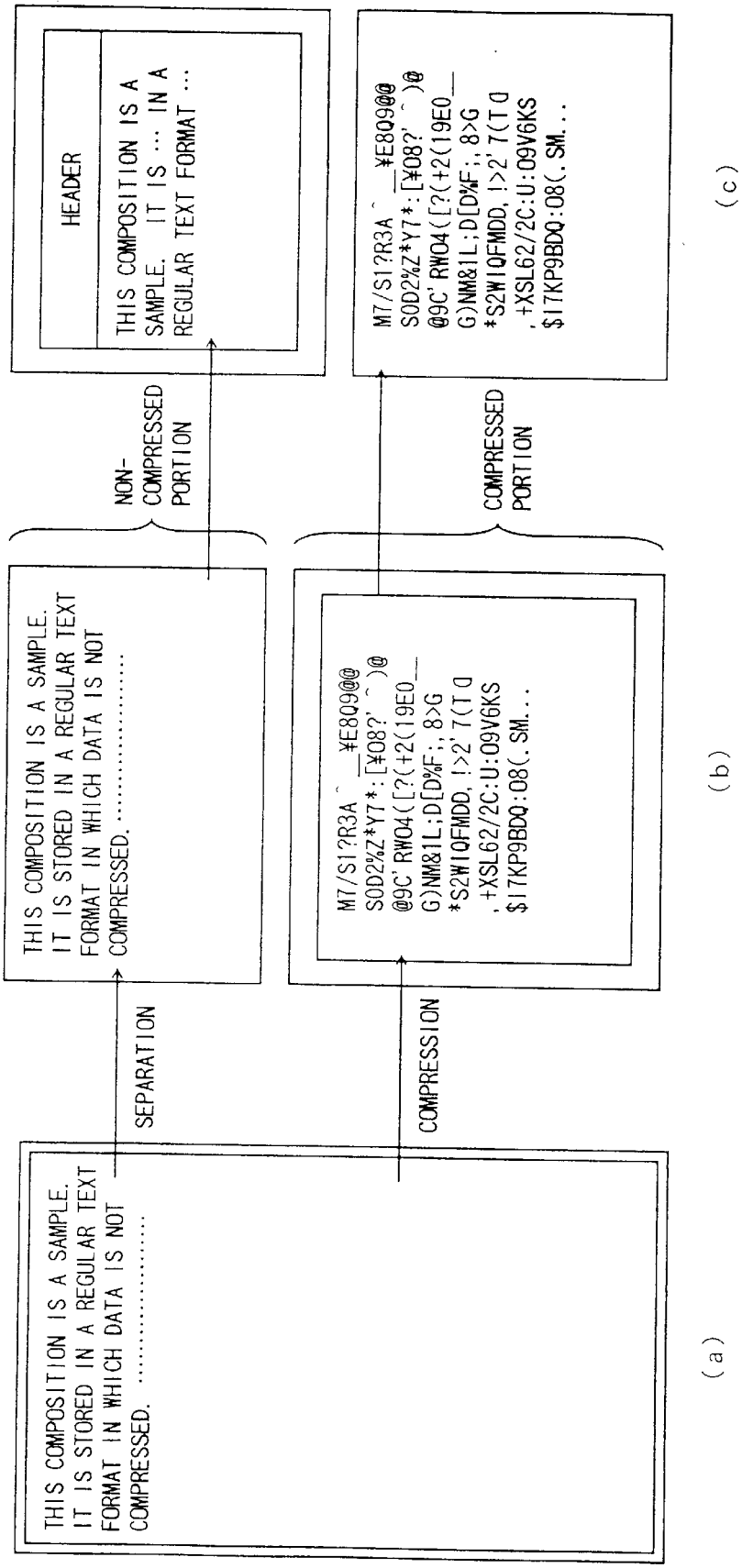
FIG. 10 is a typical illustration useful for understanding an information processing system at the server end.
Figure 11:
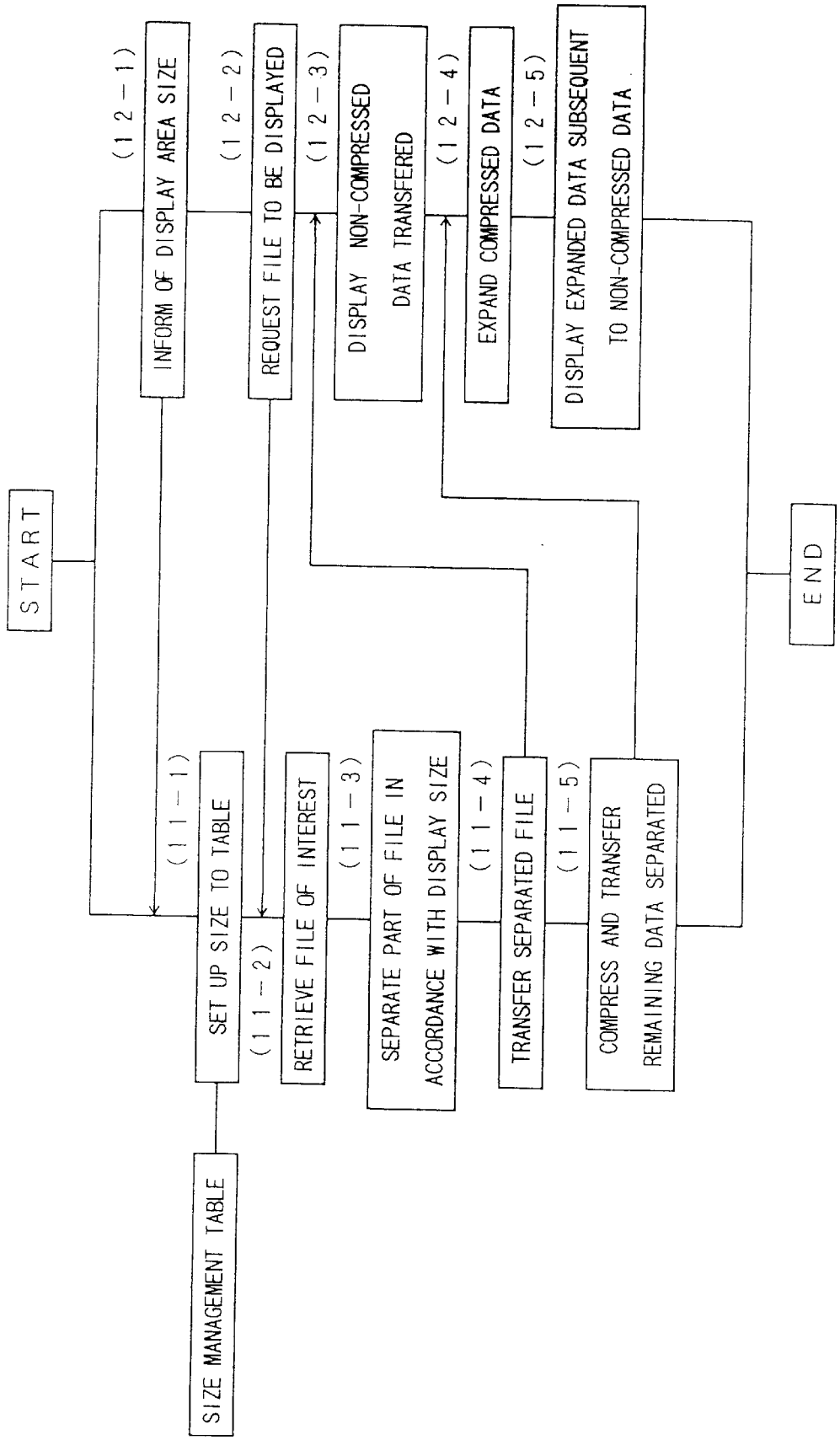
FIG. 11 is a flowchart of a basic processing routine of the server and the client according to another embodiment of the present invention.

FIGS. 9(A) and (B) are the illustrations of a management table in which sizes of a display area of the respective clients, which were informed from a plurality of clients to the server, and a character number corresponding table which represents a corresponding relation between the size of the display area and the number of characters which can be displayed in the associated display area, respectively. FIG. 10 is a typical illustration useful for understanding an information processing system at the server end. FIG. 11 is a flowchart of a basic processing routine of the server and the client according to another embodiment of the present invention.

In the system structure shown in FIG. 21, according to the present embodiment, information storage unit 11 at the server 10 end stores, as shown in part (a) of FIG. 10, information in the format of a non-compression type. In the server 10, there is prepared a size management table shown in FIG. 9(A). Further, in the server 10, there is stored a character number corresponding table shown in FIG. 9(B).

Referring to FIG. 11, the client 20 first informs the server 10 of a size of a display area (step 12-1). In the server 10, upon receipt of information as to the size of the display area from the client 20, the informed size of the display area is stored in the size management table shown in FIG. 9(A) (step 11-1). Next, the client 20 requests of the server 10 a file to be displayed (step 12-2). In the server 10, upon receipt of the information distribution demand from the client 20, the file of interest is retrieved (step 11-2).

In step 11-3, of the information (cf. part (a) of FIG. 10) specified through the retrieval in step 11-2 a portion (non-compressed portion in part (b) of FIG. 10) corresponding to the number of characters specified by the size management table and the character number corresponding table shown in FIGS. 9(A) and 9(B) is separated (step 11-3), and then immediately transferred to the client (step 11-4). In transferred information of the non-compressed portion, there is described such a matter that it is a part of the whole information, so that it can be jointed with the remaining information portion at the client 20 end. On the server side, the divided remaining information is compressed and then transferred to the client 20 (step 11-5).

Incidentally, "SIZE" in the character number corresponding table shown in FIG. 9(B) corresponds to the product of "X size" and "Y size" in the size management table shown in FIG. 9(A).

On the other hand, the client interprets the header of the non-compression type of partial information, which was transferred first, and recognizes that it is a part of the requested information and waits the subsequent remaining partial information, while the partial information is displayed on the display screen (step 12-2). When the remaining information is transmitted, the transmitted compressed information is expanded (step 12-4), and the expanded information is jointed with the previously transmitted information, which has been displayed on the display screen, so that it is displayed subsequent to the previously transmitted and now displayed information (step 12-5).

FIG. 12 is a typical illustration of a character number management table which represents a corresponding relation between the client and the number of characters which can be displayed in the associated display area.

It is acceptable that the character number management table shown in FIG. 12 is provided instead of the size management table shown in FIG. 9(A), and information as to the size of the display area, which was transmitted from the client, is converted into the number of characters and then stored in the character number management table shown in FIG. 12. Further, it is also acceptable that the character number management table shown in FIG. 12 is provided instead of both the size management table and the character number corresponding table shown in FIGS. 9(A) and 9(B), through transmission of information as to the number of characters from the client.

(Fourth embodiment)

Figure 13:
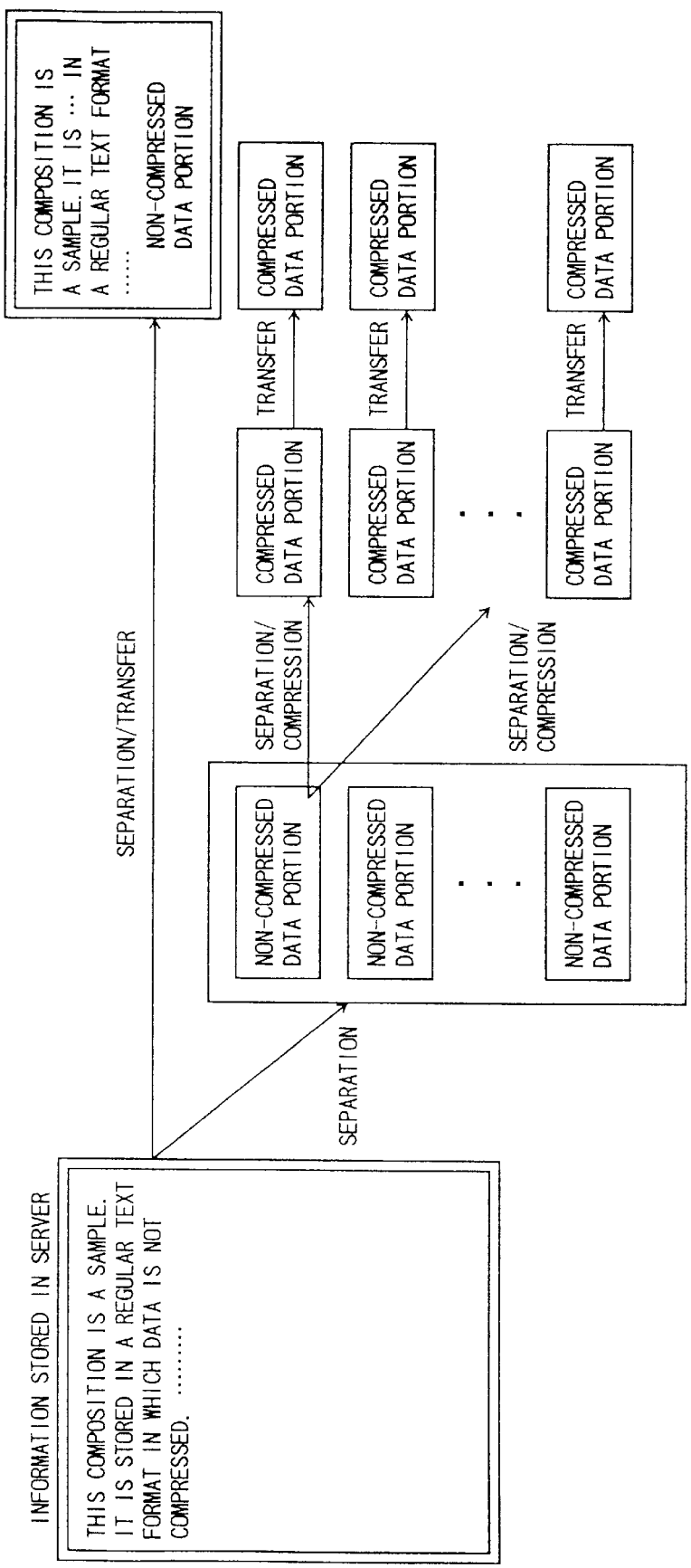
FIG. 13 is a typical illustration useful for understanding an information processing system at the server end.
Figure 14:
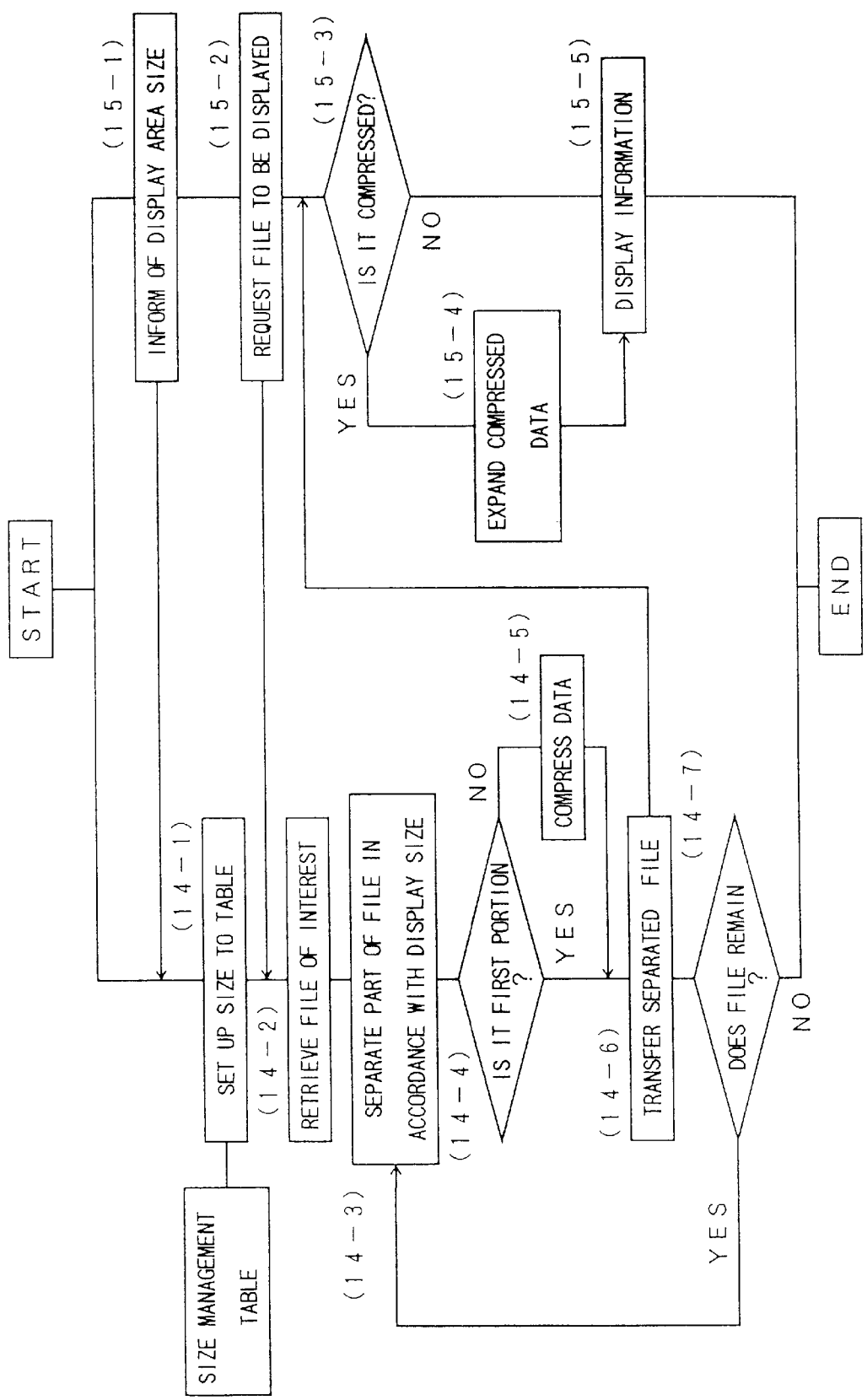
FIG. 14 is a flowchart of a basic processing routine of the server and the client according to still another embodiment of the present invention.

FIG. 13 is a typical illustration useful for understanding an information processing system at the server end. FIG. 14 is a flowchart of a basic processing routine of the server and the client according to th present embodiment of the present invention.

In the similar fashion to that of the above-mentioned embodiments, the client 20 first informs the server 10 of the display area size (step 15-1). Upon receipt of the size information, the server 10 stores the informed size in the size management table shown in FIG. 9(A) (step 14-1). Next, the client 20 requests of the server 10 transfer of a file to be displayed (step 15-2). In response to this request, the server 10 retrieves a file of interest (step 14-2). When the file of interest is specified through the retrieval, the process goes to step 14-3 in which the specified file is partitioned from the top in turn into sizes corresponding to the number of characters specified in accordance with the size management table and the character number corresponding table shown in FIGS. 9(A) and 9(B). In step 14-4, it is determined as to whether the partitioned portion is the head portion of the file. If it is the head portion, that portion is immediately transferred to the client (step 14-6). On the other hand, if it is not the head portion, data of that portion is compressed (step 14-5) and then transferred to the client (step 14-6). Thereafter, on the server 10 side, in step 14-7, it is determined as to whether the above processing has been completed up to the final portion of the file specified through the retrieval in step 14-2. As a result, if the remaining portion exists, the program returns to the step 14-3.

On the other hand, in the client 20, whenever it receives in turn the partial information of the size corresponding to the display area size informed in step 15-1 from the server 10, it is determined as to whether the transmitted partial information is compressed (step 15-3). If it is not compressed, the partial information is immediately displayed (step 15-5). On the subsequent compressed portion, the compressed information is expanded to the non-compressed information (step 15-4) and then the partial information is displayed (step 15-5).

Figure 15:
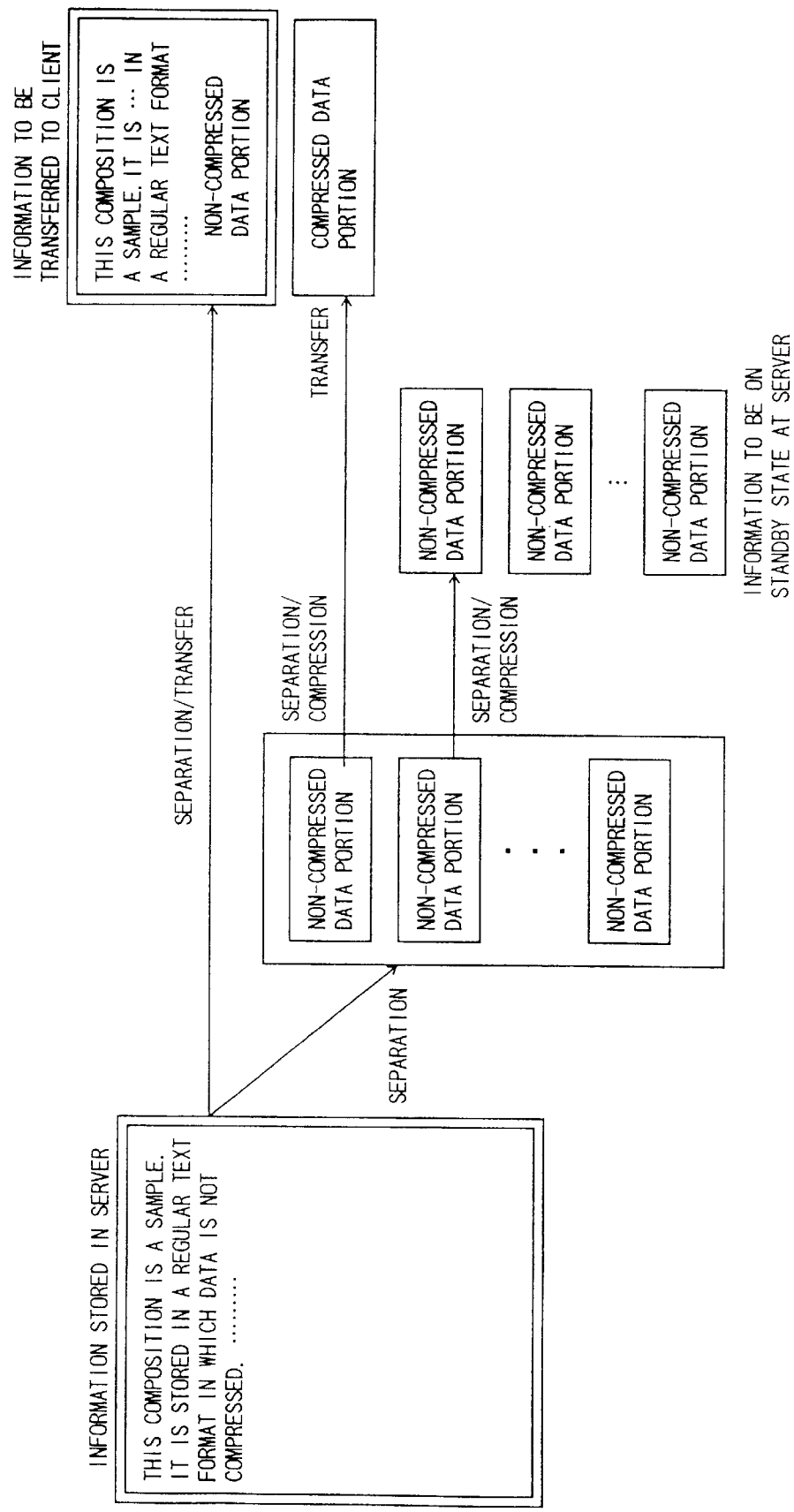
FIGS. 15–18 are each a typical illustration useful for understanding an example of an information processing system at the server end.
Figure 16:
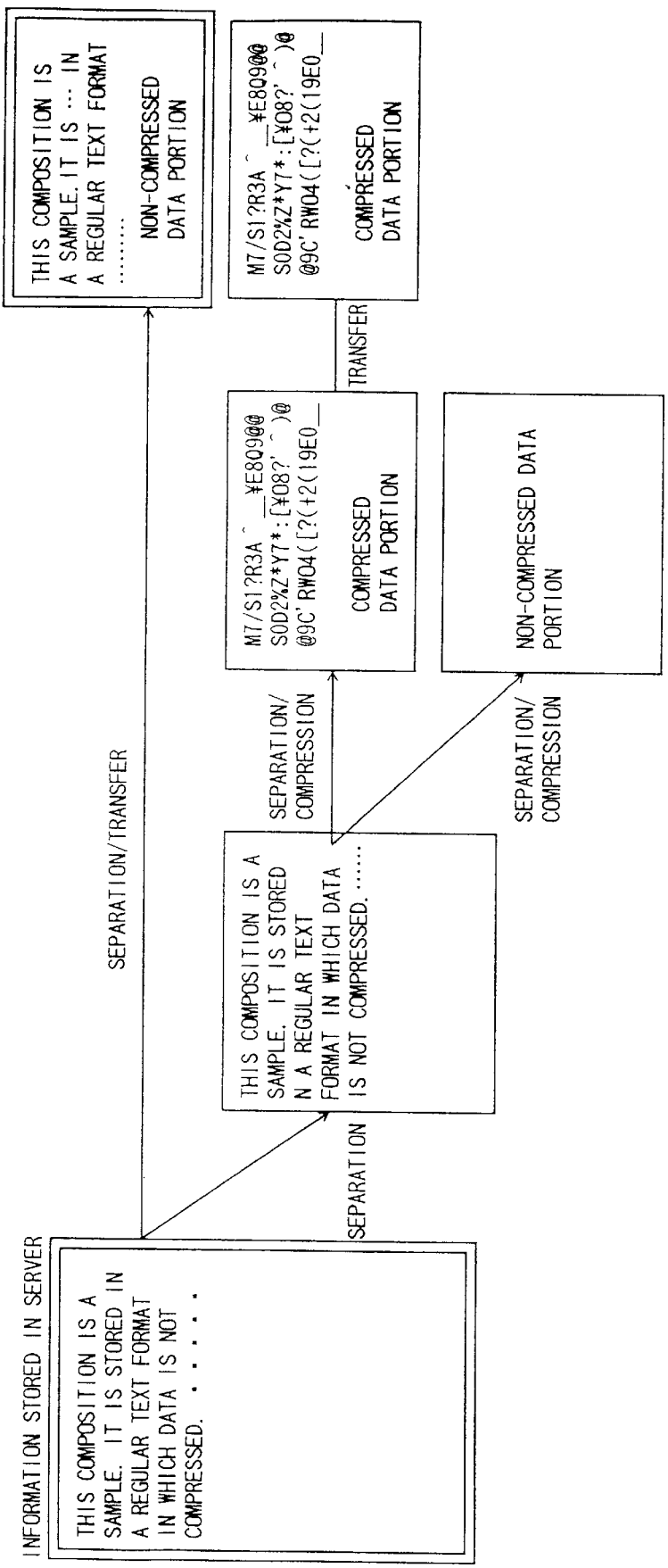
Figure 17:
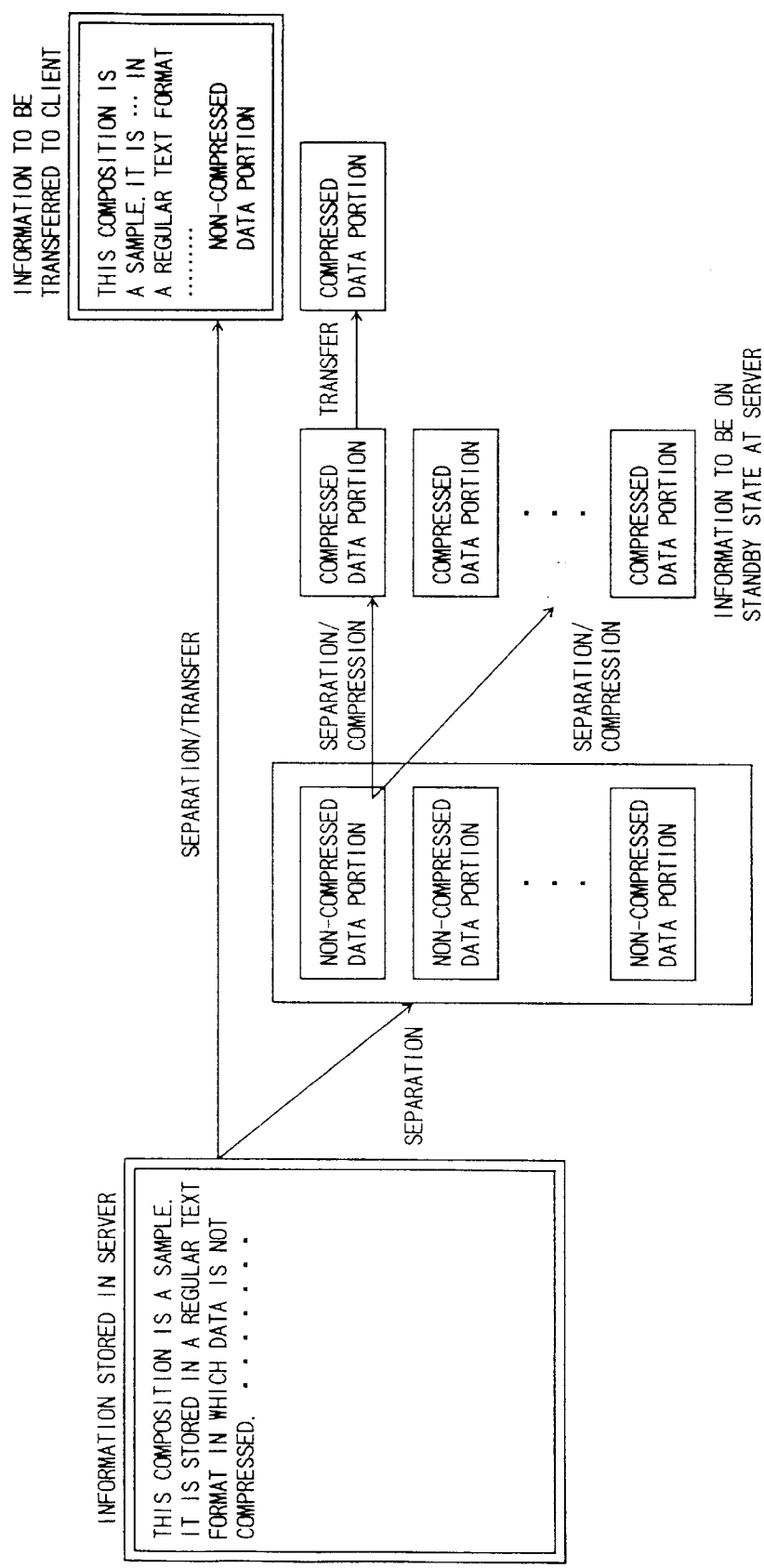

FIGS. 15–17 are each a typical illustration useful for understanding an example of an information processing system at the server end.

According to the information processing system shown in FIG. 13, it is arranged in such a manner that information to be transferred from the server to the client is partitioned into a plurality of partial areas of sizes corresponding to the display area sizes of the client, and the partial information on the first partial area is transmitted directly in the form of the non-compression and pieces of partial information on the partial areas other than the first partial area are in turn compressed and then transmitted. However, it is acceptable to provide such an arrangement that as shown in FIG. 15, only the first partial information on the non-compression is transmitted, and pieces of other partial information are compressed and saved in the server so that they are transmitted whenever the transfer demand occurs from the client. Further, it is also acceptable to provide such an arrangement that as shown in FIG. 16, only the first partial information on the non-compression is transmitted, and pieces of other partial information are maintained in a state of non-compression until the next demand occurs and when the next demand occurs, they are subjected to the compression processing and then transmitted. Furthermore, it is also acceptable to provide such an arrangement that as shown in FIG. 17, only the first partial information is transmitted in the state of the non-compression directly, and the second partial information subsequent to the first partial information is compressed and then transmitted, and the third partial information subsequent to the second partial information is subjected to the compression processing only and be saved without being transmitted, and the remaining partial information is saved in the state of the non-compression in the server. In such arrangement, when the next transfer demand occurs, the second partial information saved in the state of the compression is transmitted and the third subsequent to the second partial information is subjected to the compression processing only and be saved without being transmitted.

(Another embodiment)

Figure 18:
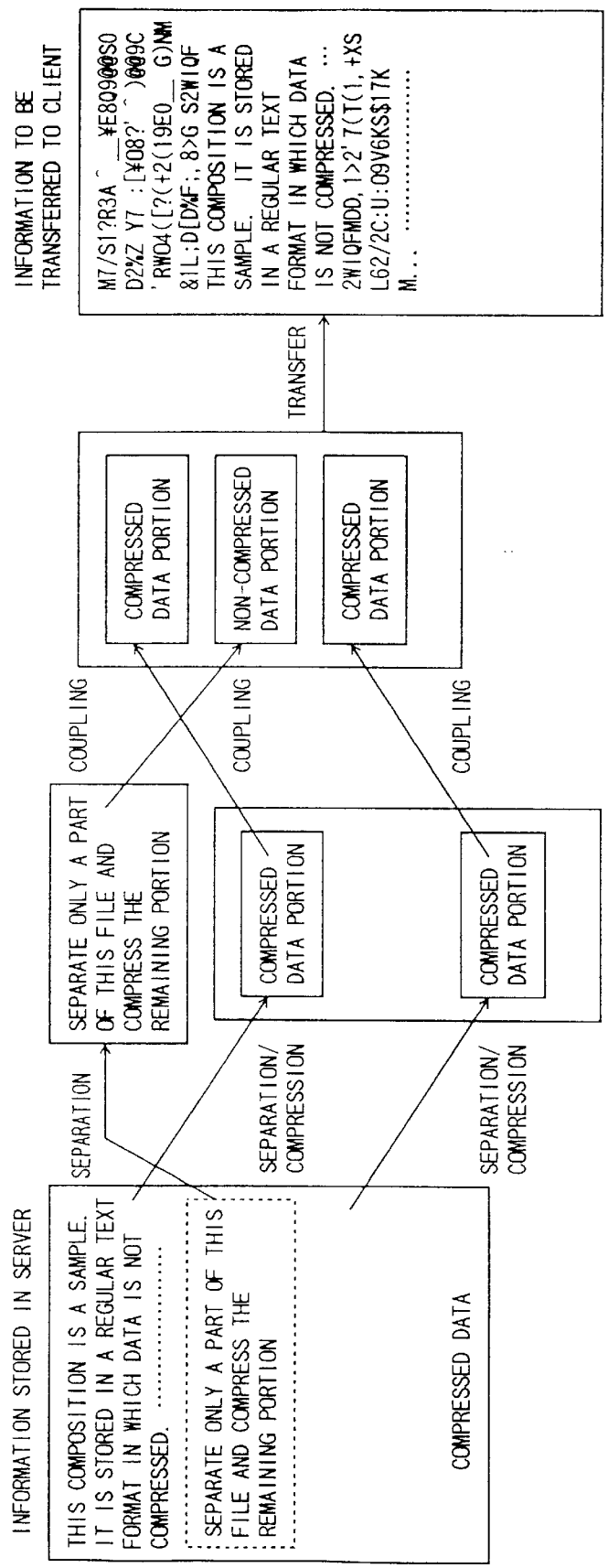

FIG. 18 is a typical illustration useful for understanding another example of an information processing system at the server end.

According to the above-mentioned embodiments, it has been explained that the partial information to be first displayed on the client side is the first partial information of the information messages to be transmitted from the server to the client. However, it is not necessary that the partial information to be first displayed on the client side is always the first partial information. For example, as shown in FIG. 18, it is acceptable to provide such an arrangement that the server stores the non-compressed data, and a part of partial information in mid way is partitioned and transmitted in form of the non-compressed data and the other partial information is compressed and transmitted, and on the client side, the partial information of the non-compressed data is first displayed and the other partial information is subjected to the expansion processing and thereafter displayed. With respect to the matter as to what partial information is transmitted in the state of the non-compression, it is acceptable that when the information distribution demand is issued, the client designates it, alternatively, the server stores beforehand such information.

Incidentally, it is acceptable either that the non-compression of partial information and the compression of partial information are transmitted to the client, as shown in FIG. 18, through coupling with each other at the server end, or that first only the non-compression of partial information is transmitted to the client, and thereafter other partial information is compressed and then transmitted to the client, so that those two kinds of partial information are coupled with each other at the client end.

Figure 19:
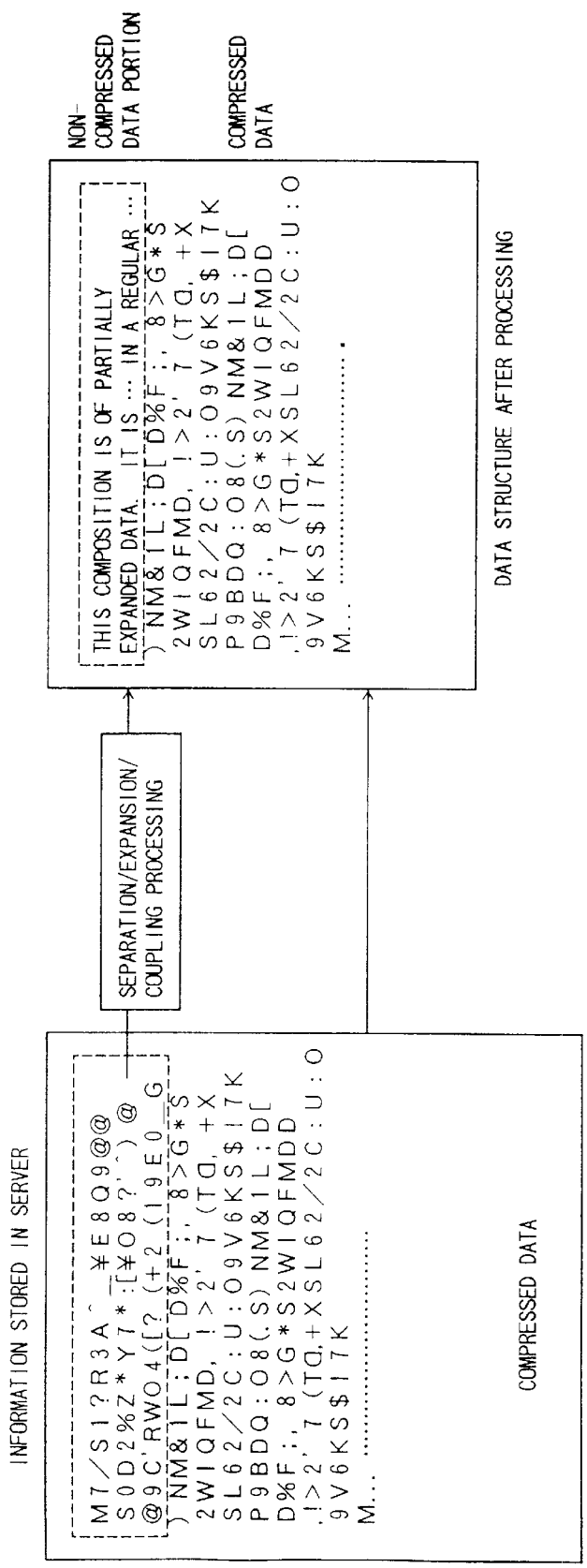
FIGS. 19–20 are each a typical illustration useful for understanding an example of an information processing system at the server end in the event that information is stored in form of the compression at the server end.

FIG. 19 is a typical illustration useful for understanding an example of an information processing system at the server end in the event that information is stored in form of the compression at the server end.

Here, at the server end, only a part of the first is partitioned and expanded, and then coupled with the remaining partial information of compression format and transmitted to the client. Incidentally, it is the similar as to the matter of the above-mentioned embodiments that the non-compression of partial information and the compression of partial information may be transmitted individually to the client, and then coupled with each other at the client end.

Figure 20:
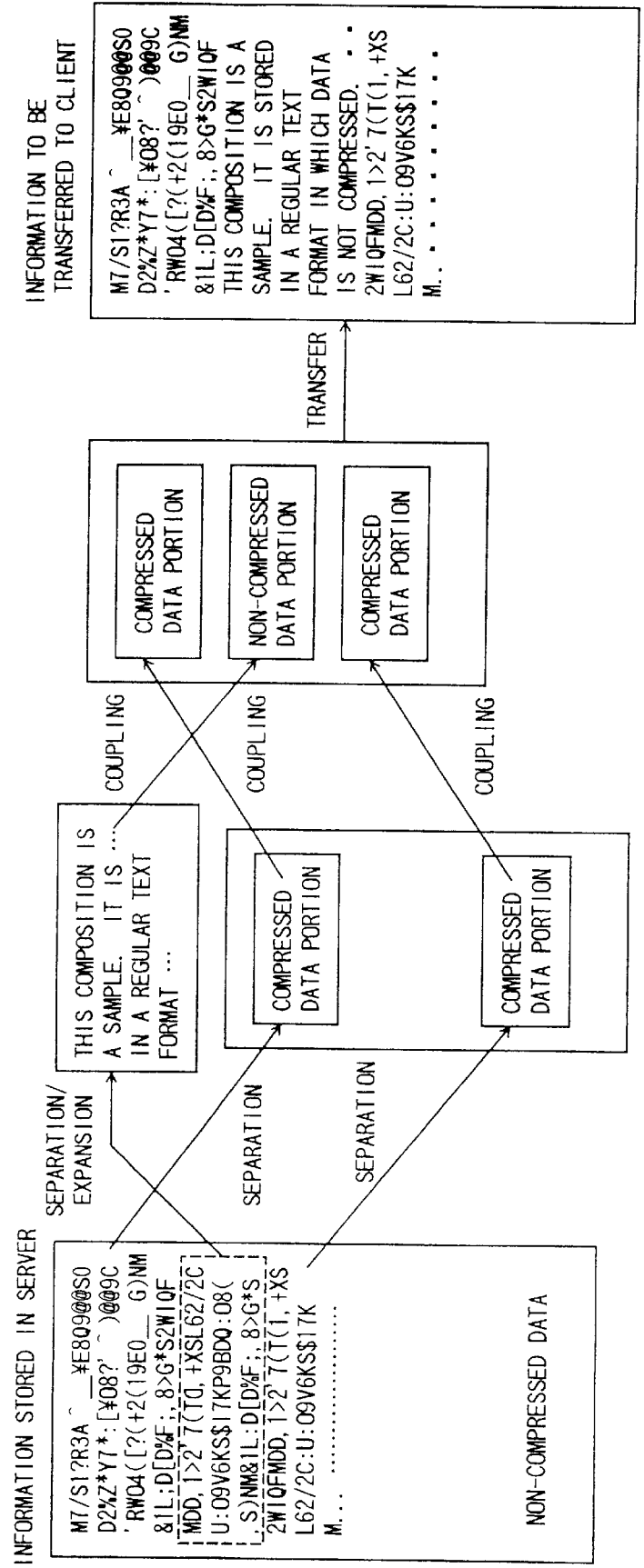

FIG. 20 is a typical illustration useful for understanding another example of an information processing system at the server end in the event that information is stored in form of the compression at the server end.

According to the present embodiment, only a part of information to be distributed to the client is subjected to the expansion processing and transferred. In the client, the partial information transmitted in the form of the non-compression is first displayed, and the partial information transmitted in the form of the compression is subjected to the expansion processing and then displayed subsequent to the partial information transmitted in the form of the non-compression, or as a substitute for that partial information.

As mentioned above, according to the present invention, when information is transmitted from the server to the client, the partial information used first for a display and the like is transmitted in the form of the non-compression and at least part of partial information of the remaining partial information is transmitted in the form of the compression. This feature makes it possible for the client side to immediately perform the display and in addition to reduce the transmission time as the whole.

While the present invention has been described with reference to the particular illustrative embodiments, it is not to be restricted by those embodiments but only by the appended claims. It is to be appreciated that those skilled in the art can change of modify the embodiments without departing from the scope and spirit of the present invention.

We claim:

1. An information display system comprising:
   an information distribution apparatus storing information, and upon receipt of an information distribution demand, distributing requested information to an information distribution requesting source; and
   an information display apparatus displaying information distributed from said information distribution apparatus on a display screen by requesting information distribution from said information distribution apparatus,
   said information distribution apparatus and said information display apparatus being connected to each other via a communication line,
   wherein said information distribution apparatus comprises an information distributing unit adapted to distribute first partial information to be first displayed on said information display apparatus, said first partial information being of a plurality of pieces of partial information partitioned into information to be distributed to said information display apparatus, said information distributing unit distributing said first partial information to said information display apparatus in non-compressed form, and to distribute second partial information comprising at least a part of the remaining partial information except the first partial information to said information display apparatus in compressed form, and wherein said information display apparatus comprises:

an information expansion unit expanding the second partial information into a non-compressed format of information, and
   a display control unit displaying first the first partial information and thereafter displaying partial information other than the first partial information.

2. An information display system according to claim 1, wherein said information display apparatus comprises a character number informing unit informing said information distribution apparatus of character number information representative of a number of characters to be displayed on said information display apparatus or to be converted into the number of characters, and
   wherein said information distribution apparatus partitions information to be distributed to said information display apparatus into sizes according to the character number information informed from said information display apparatus, thereby producing said plurality of pieces of partial information.

3. An information display system according to claim 1, wherein said information display apparatus comprises an information distribution requirement unit adapted to request of said information distribution apparatus a distribution of information prior to distributing information from said information distribution apparatus, and to request of said information distribution apparatus a distribution of information whenever a display is updated even in mid way of displaying information distributed from said information distribution apparatus, and
   wherein said information distribution apparatus distributes information to said information display apparatus in such a manner that the first partial information is distributed in non-compressed form in accordance with a first information distribution request issued from said information display apparatus, and the remaining pieces of partial information are distributed in compressed form in accordance with a new information distribution request issued from said information display apparatus.

4. An information display system according to claim 1, wherein said information display apparatus comprises an information distribution requirement unit adapted to request of said information distribution apparatus a distribution of information prior to distributing information from said information distribution apparatus, and to request of said information distribution apparatus a distribution of information whenever a display is updated even in mid way of displaying information distributed from said information distribution apparatus, and wherein said information distribution apparatus distributes information to said information display apparatus in such a manner that the first partial information is distributed in non-compressed form in accordance with a first information distribution request issued from said information display apparatus, the partial information to be displayed subsequent to a display of the first partial information is distributed in compressed form, and the remaining pieces of partial information are distributed in compressed form in accordance with a new information distribution request issued from said information display apparatus.

5. An information distribution apparatus for storing information, upon receipt of an information distribution demand, to distribute requested information to an information distribution requesting source, comprising:
   an information distributing unit adapted to distribute first partial information to be first displayed on said information display apparatus, said first partial information being of a plurality of pieces of partial information which are partitioned in information to be distributed to said information display apparatus, to said information display apparatus in non-compressed form, and to distribute second partial information comprising at least a part of the remaining partial information excepting the first partial information to said information display apparatus in compressed form.

6. An information distribution apparatus according to claim 5, further comprising:

a character number receiving unit receiving character number information representative of a number of characters to be utilized at a time in an information distribution requesting source or to be converted into the number of characters; and an information partitioning unit partitioning information to be distributed to said information distribution requesting source into sizes according to the character number information informed from said information distribution requesting sources, thereby producing said plurality of pieces of partial information.

7. An information distribution apparatus according to claim 5, further comprising:

an information storage unit storing information to be distributed to an information distribution requesting source in both compressed and non-compressed forms, wherein said information distributing unit distributes information to the information distribution requesting source in combination of a compressed type of partial information and a non-compressed type of partial information.

8. An information distribution apparatus according to claim 5, further comprising:

an information storage unit storing information to be distributed to an information distribution requesting source in non-compressed form, wherein said information distributing unit distributes information to the information distribution requesting source through compressing said second partial information.

9. An information distribution apparatus according to claim 5, further comprising:

an information storage unit storing information to be distributed to an information distribution requesting source in a compressed form, wherein said information distributing unit distributes information to the information distribution requesting source through expanding said first partial information to a non-compressed type of information.

10. An information distribution apparatus according to claim 5, wherein said information distribution apparatus distributes information to said information display apparatus in such a manner that the first partial information is distributed in non-compressed form in accordance with a first information distribution request issued from said information display apparatus, and the remaining pieces of partial information are distributed in compressed form in accordance with a new information distribution request issued from said information display apparatus.

11. An information distribution apparatus according to claim 5, wherein said information distribution apparatus distributes information to said information display apparatus in such a manner that the first partial information is distributed in non-compressed form in accordance with a first information distribution request issued from said information display apparatus, the partial information to be displayed subsequent to a display of the first partial information is distributed in compressed form, and the remaining pieces of partial information are distributed in compressed form in accordance with a new information distribution request issued from said information display apparatus.

12. An information display apparatus for displaying information distributed from an information distribution source on a display screen through requesting of said information distribution source information distribution, said information display apparatus comprising:

an information receiving unit receiving a distribution of information comprising a non-compressed type of partial information and a compressed type of partial information;

an information expansion unit expanding a compressed type of partial information of information distributed from the information distribution source into a non-compressed type of partial information; and a display control unit providing control such that at least a part of the first partial information of the partial information distributed in non-compressed form from the information distribution source and thereafter partial information other than the first partial information is displayed.

13. An information display apparatus according to claim 12 further comprising a character number informing unit informing the information distribution source of character number information representative of a number of characters to be displayed on said information display apparatus or to be converted into the number of characters.

14. An information display apparatus according to claim 12 further comprising an information distribution requirement unit adapted to request of the information distribution source a distribution of information prior to distributing information from the information distribution source, and to request of the information distribution source a distribution of information whenever a display is updated even in mid way of displaying information distributed from the information distribution source.

* * * * *